United States Patent [19]

Chaum

[11] 4,120,588
[45] Oct. 17, 1978

[54] MULTIPLE PATH CONFIGURATION FOR A LASER INTERFEROMETER

[76] Inventor: Erik Chaum, 4701 Caritina Dr., Tarzana, Calif. 91356

[21] Appl. No.: 704,444

[22] Filed: Jul. 12, 1976

[51] Int. Cl.² .............................................. G01B 9/02
[52] U.S. Cl. ........................... 356/106 LR; 350/96.11
[58] Field of Search ................................. 356/106 LR

[56] References Cited

U.S. PATENT DOCUMENTS

| 3,102,953 | 9/1963 | Wallace ..................... 356/106 LR X |
| 4,013,365 | 3/1977 | Vali et al. ...................... 356/106 LR |

FOREIGN PATENT DOCUMENTS

| 1,807,247 | 5/1970 | Fed. Rep. of Germany .... 356/106 LR |

*Primary Examiner*—John K. Corbin
*Assistant Examiner*—Matthew W. Koren

*Attorney, Agent, or Firm*—Spensley, Horn & Lubitz

[57] ABSTRACT

By appropriately arranging and configuring dielectric waveguides formed within a substrate, a path configuration suitable for use in laser interferometer may be fabricated in a small overall area without sacrificing overall sensitivity. The path configuration includes a disposition of overlapping waveguide loops in a first and second plane. Intersection of the crossing waveguide segments is avoided by appropriate disposition of the respective segments in the two separated planes. Transition between the two planes may be made by means of a twisted waveguide bend or a transitional coupler. In one embodiment each waveguide loop may have a generally rectangular shape. The parallel sides of each loop are offset from the adjacent loops by a predetermined distance such that the horizontal dimension of the loops decreases while the vertical dimension increases between the first and last loop of the configuration.

14 Claims, 7 Drawing Figures

MULTIPLE PATH CONFIGURATION FOR A LASER INTERFEROMETER

BACKGROUND OF THE INVENTION

1. Field of the Invention

The present invention relates to the field of laser interferometers and more particularly to the optical path configuration in ring interferometer employing optical waveguides.

2. Description of the Prior Art

As early as 1925, Michelson and Gale fabricated a large interferometer which measured the fringe shift created in a beam of light due to the speed of rotation of the earth. Since that time, it has been appreciated that an inertial gyroscope may be fabricated using a ring interferometer. A typical example of a prior art ring interferometer can be seen in U.S. Letters Pat. No. 3,102,953.

The sensitivity of a ring interferometer can be increased by increasing the area enclosed by the ring. Prior art interferometers have employed multiple looped paths of fiber optics or mirrors. In such configurations stability and attenuation over long path lengths limit the ability of achieving large enclosed areas. Moreover, the temporal coherence of a beam is difficult to maintain to such prior art interferometers which are multimode light guides over a long path.

Therefore, what is needed is a configuration for a transmission path for an inertial rate sensor, such as a ring interferometer, which may be fabricated in a small space, which will be stable, single mode and relatively inexpensive without sacrificing the sensitivity achievable by the larger inertial rate sensors.

BRIEF SUMMARY OF THE INVENTION

The present invention is a closed transmission path in an inertial rotational rate sensor, which path comprises at least a first and second plurality of waveguide segments and a corresponding plurality of waveguide transition segments. The plurality of waveguide segments and waveguide transition segments are disposed in at least two planes in an overlying relationship. The first plurality of waveguide segments lies in a first plane and may generally provide for transmission of electromagnetic energy along a first axis. The second plurality of waveguide segments lie in a second plane offset and isolated from the first plane. In one embodiment, the second plurality of waveguide segments generally provide for transmission of electromagnetic energy along a second axis which is perpendicular to the first axis. A corresponding plurality of waveguide transition segments couple each waveguide segment of the first plurality of waveguide segments disposed in the first plane with a corresponding waveguide segment of the second plurality of waveguide segments disposed in the second plane. The first and second plurality of waveguide segments are coupled by the corresponding plurality of waveguide transition segments to form a closed loop.

The closed loop occupies an overall area which is many times smaller than achievable in the prior art and yet is capable of providing a transmission path for a ring interferometer which will have the same sensitivities as the larger prior art ring interferometers.

DETAILED DESCRIPTION OF THE PREFERRED EMBODIMENTS

The present invention is a transmission path for use in an inertial rotational sensor, which is particularly adapted to a ring interferometer, operating in the optical region. The transmission path comprises a first plurality of dielectric waveguide segments formed in a substrate on a first plane. A second plurality of dielectric waveguide segments are formed in the substrate on a second plane which is offset and optically isolated from the first plurality of dielectric waveguide segments. Coupling means formed in the substrate transmit optical energy between the first plurality of waveguide segments disposed in the first plane and the second plurality of waveguide segments disposed in the second plane. The first and second plurality of waveguide segments together with the coupling means form a continuous optical path enclosing an area and having a length, which area and length may assume a predetermined ratio. The sensitivity of the ring interferometer is determined by the value of the area enclosed. By virtue of the present invention an optical transmission path may be formed within a dielectric or semiconducting substrate which has overall dimensions substantially smaller than prior art transmission paths without sacrificing any of the sensitivity which was obtainable by such prior art paths. The transmission path, in addition to assuming a small amount of volume or area, is rugged and may be fabricated without undue difficulty or expense. The various embodiments of the present invention and its method of operation may be better understood by viewing FIGS. 1-6.

Figure 1:
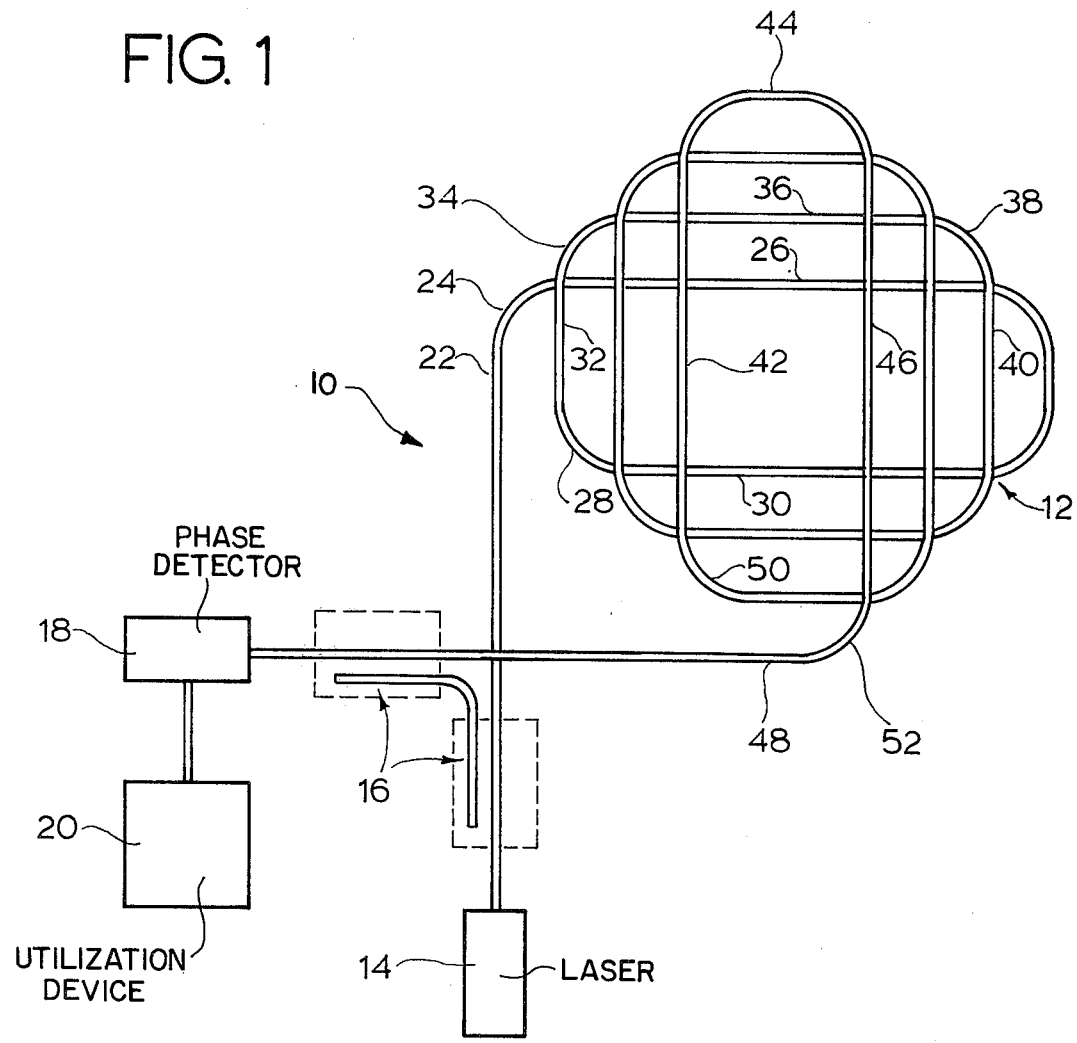
FIG. 1 is a schematic plan view of a ring interferometers employing the transmission path of the present invention.

In particular, FIG. 1 shows a schematic plan view of the present invention employed in a ring interferometer 10. Typically, a ring interferometer is comprised of an optical transmission path 12 at least one laser 14, means 16 for splitting and combining two light beams, a phase detector 18, and a utilization device 20 for analyzing the output of phase detector 18 and producting a cognizable signal to the human operator. In an interferometer, utilization device 20 measures phase changes or finge shifts, which are responsive to the angular rate of rotation of transmission path 12. The detection equipment, phase detector 18 and utilization device 20, is adapted to either measuring phase changes or fringe shifts. For example, phase detector 18 may include at least one photodetector, while utilization device 20 may include various signal conditioning and counter circuits. The placement and nature of laser 14, phase detector 18, beam splitting means 16 and utilization device 20 may be modified in any well known manner without departing from the scope of the present invention. The present invention is, therefore, described in connection with a ring interferometer 10, although it is to be expressly understood that transmission path 12 as described may be adapted to any other application well known to the art.

Laser 14 generates a coherent light beam. A beam splitting means 16, which functions as a half silvered mirror, splits the beam from laser 14 into a reference beam and a beam which may traverse transmission path 12 in a counter-clockwise sense of rotation. Both beams are recombined in beam splitting means 16 and the resultant phase shift is detected by phase detector 18. The detected phase shift is coupled to utilization device 20 where it is analyzed and processed to produce the desired output signal which could include an indication of angular orientation in a gyroscope or angular rate of rotation in a gyroscopic guidance control device. As transmission path 12 is rotated, the traveling beam will experience a different travel time as determined by the rate of angular rotation. The difference in travel time may be interpreted as a difference in effective path length of the beam propagation. Thus, when the reference beam is recombined with the traveling beam an interference pattern may be produced based on the relative phase shift of the traveling beam with respect to the reference beam.

It is well established that the shift in phase is given by the formula:

$$\Delta\phi = KA\Omega/C\lambda$$

where,
$A$ is the enclosed area within transmission path 12,
$C$ is the speed of light,
$\lambda$ is the wave length of the laser light employed,
$K$ is a constant,
$\Omega$ is the angular rate of rotation around an axis normal to the plane or parallel planes defined by transmission path 12.

Thus, the sensitivity or phase shift induced for a given angular rate of rotation depends on the area enclosed by transmission path 12.

In the embodiment illustrated in FIG. 1, one path is illustrated which incorporates the present invention. For example, beginning at laser 14 light travels to beam splitting means 16. A portion of the beam energy is coupled from waveguide segment 22 to waveguide segment 54 by means of a parallel waveguide directional coupler, well known to the art, which coupler is coupled to waveguide segments 22 and 54. Beam splitting means 16 is thus illustrated as a two parallel waveguide couplers coupled to waveguide segments 22 and 54 respectively and mutually coupled by a waveguide bend. It is to be understood, however, that any equivalent means known to the art may be employed to serve the function of beam splitting means 16. A portion of the beam continues along optical waveguide segment 22 through a transition element 24 which consists of 90° angle bend to a waveguide segment 26. The beam continues through additional transition segments and waveguide segments in a first plane until it approaches transition segment 28. Transition segment 28 is a twisted transition segment as described below, and couples waveguide 30 in a first plane with a waveguide segment 32 in a second plane. Thus, when waveguide segment 32 crosses waveguide segment 26, each waveguide segment is offset and optically isolated. In this manner interference and cross-coupling between the respective waveguide segments is avoided. However, waveguide segment 32 may be coupled to a twisted transition segment 34 which returns the optical waveguide path to the first plane and couples the energy to waveguide segment 36 disposed in the first plane. Similarly, waveguide segment 36 is coupled to a twisted transition element 38 which in turn is coupled to a waveguide segment 40 which is disposed in the second plane. Thus, waveguide segment 40 crosses waveguide segment 26 and is offset and isolated therefrom. The remaining waveguide segments are ultimately disposed in the first and second plane and are coupled by twisted transition segments as described above. When the last loop is formed, waveguide segments 42, 44, 46, and 48 may be entirely disposed within the second plane. Among the transistion segments coupled to waveguide segments 42, 44, 46, and 48, only transition segment 50 needs to be a twisted transition segment.

Figure 2A:
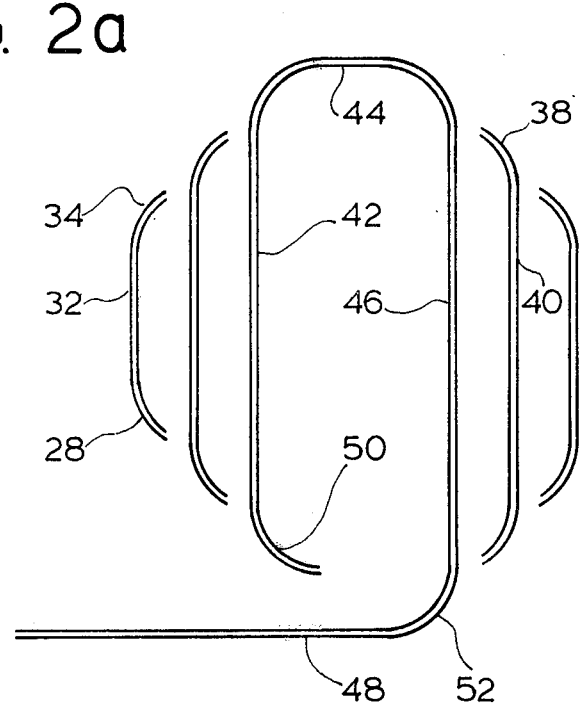
FIGS. 2a and 2b are a schematic plan view of the first and second plane of the transmission path shown in FIG. 1.
Figure 2B:
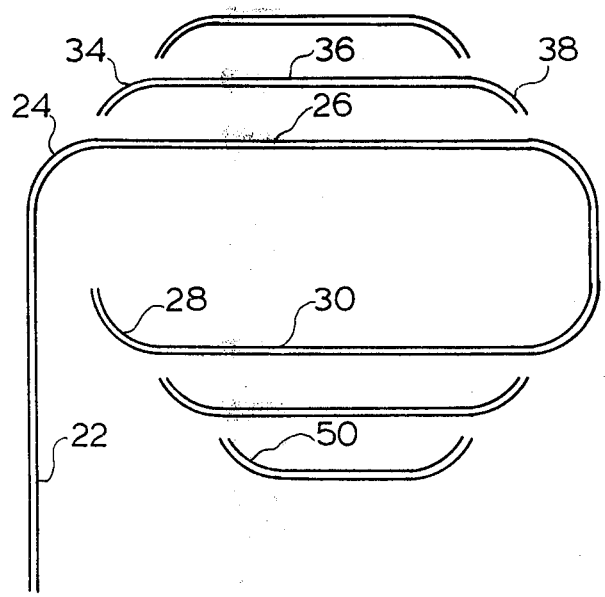

The biplaner disposition of each of the waveguide segments can be better understood in connection with the FIGS. 2a and 2b. FIG. 2a illustrates those waveguide segments of FIG. 1 which are disposed in the second plane. Similarly, FIG. 2b illustrates those waveguide segments which are disposed in the first plane. One-half of each transition segment is illustrated for the purposes of convenience as being in the first and second planes. It can be noted that the second plane contains substantially all of the waveguide segments parallel to the vertical axis of FIG. 1, while the first plane contains substantially all of the waveguide segments parallel to the horizontal axis of FIG. 1. Each pair of segments in FIG. 2a and 2b, which are perpendicular to the remaining group of segments in the corresponding group, could, if described, be arranged by twisted transition waveguide segments to be disposed in the opposite plane. However, since no waveguide crossings are involved in these end segments, no reason exists for the addition of a twisted coupling.

It is to be understood that although the illustrated embodiment of FIGS. 1 and 2 show a generally rectangular transmission path 12, any closed geometric figure well known to the art may be employed, however, it can be shown that little improvement in the A/L (area/length) ratio is obtained by the use of any regular geometric figure beyond a four sided figure. Transmission path 12 may form an ordered plurality of rectangular loops wherein each loop has a horizontal and vertical dimension of a preselected magnitude. The second loop of the ordered plurality of loops may have a horizontal dimension less than the first loop by a predetermined amount and a vertical dimension greater than the first loop by a predetermined amount. Each higher ordered loop in the ordered plurality thus decreases in horizontal dimension and increases in vertical dimension. Similarly, when a transmission path 12, as shown in FIG. 1, is employed, the ratio of the various sizes of each loop beginning from the first loop originating from laser 14 and waveguide segment 22 to the last loop ending with phase detector 18 and waveguide segment 48 can be altered to maximize the A/L ratio for the overall configuration. For example, the ratio of the dimension R to the dimension S shown in FIG. 1 can be chosen to maximize the overall A/L ratio of transmission path 12. It can be shown that the A/L ratio is maximized and, therefore, the sensitivity achievable by transmission path 12 is maximized for a given path length when the ratio of R/S is approximately 0.370. In other words, the ratio of the normal distance between the inner and outermost waveguides, on one side, for example, the distance between waveguide segments 26 and 44, to the normal distance between the two outermost and opposite waveguides, for example, the distance between waveguide segments 44 and 48, may be varied to optimize the area to length ratio of the overall configuration. The advantage of the present invention may be appreciated when it is noted that the A/L ratio of a standard square ring interferometer, 12 inches on each side (0.305 $m$ having a total path length of 1.22 meters, can be replaced by a 45 loop path of the same design as the transmission path 12 of the present invention having a waveguide separation of 100 microns and a resulting dimension D of approximately 1.2 centimeters. The total path length of the 45 loop path is approximately 1.36 meters. Clearly, substantial space savings can be achieved without sacrificing the sensitivity of the ring interferometer.

It may be appreciated that the optical paths described above may be fabricated on any scale consistent with the state of the art with respect to waveguide design, the design of solid state thin film amplifiers and solid state technology. In the present state of the art, it is possible to stack a plurality of two plane paths as described and shown in FIG. 1 to create a single optical path. This stacking feature will allow the overall horizontal dimensions of the waveguide path to be minimized at the expense of an increase in vertical dimensions. This configuration is presently possible provided that the aggregation of paths do not exceed an attenuation length not presently practical. Because each two plane path is very thin, a very large number could be stacked one on top the other. This type of embodiment is described in greater detail in connection with FIG. 6 described.

Figure 3:
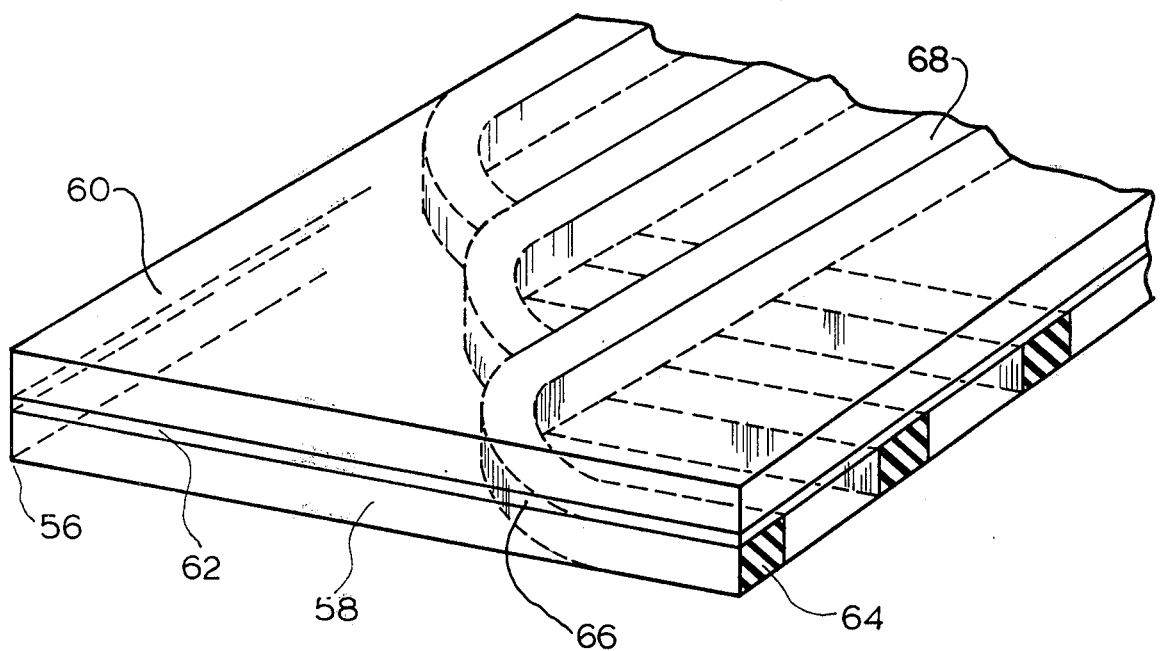
FIG. 3 is a simplified view of one portion of the ideal transmission path showing three overlapping turns coupling waveguide segments in the first and second planes.
Figure 4:
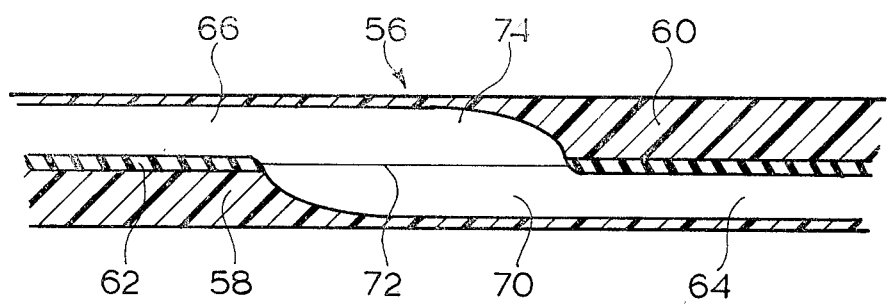
FIG. 4 is one embodiment of a tapered transistion waveguide segment which may be employed to coupled electromagnetic energy between the first and second planes.
Figure 5:
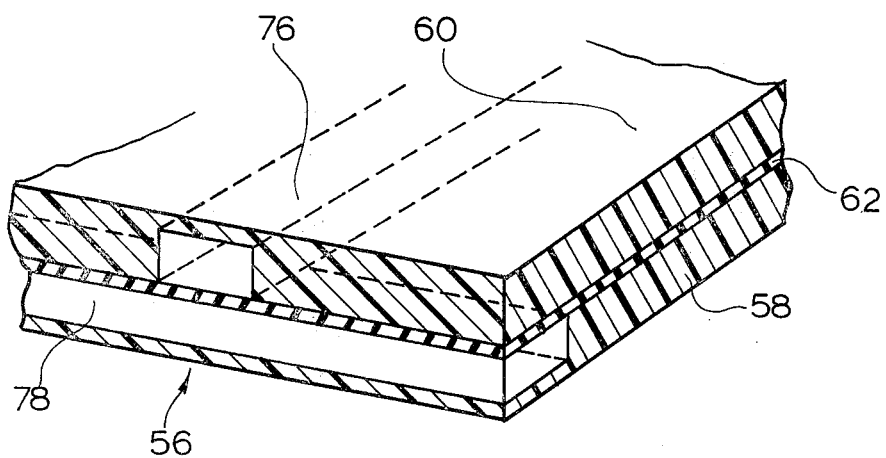
FIG. 5 is a simplified perspective showing a waveguide crossing wherein the crossing waveguide segments are offset and isolated one from the other.

One manner in which the embodiment of FIG. 1 may be fabricated is shown in FIGS. 3-5. For example, in FIG. 3 a substrate 56 of semiconductor or dielectric material such as gallium arsenide or one of its alloys $Al_xGA_{1-x}AS$ may be employed as the foundational material in which transmission path 12 may be fabricated.

It may be appreciated that when transmission path 12 is fabricated in gallium arsenide susbstrate, each of the other optical components of the system may likewise be conveniently fabricated in the same substrate. In such a case, means 16 may be a mixer, biased directional coupler or biased multiplexer which is capable of splitting or sampling a portion of the optical energy traveling through transmission path 12 to phase detector 18. Phase detector 18 may similarly be fabricated within substrate 56. Integrated optics, multiplexers, couplers, detectors, and guides are well known to the art and may be fabricated according to a technology similar to the integrated circuit art. See for example, S. Somaekh and A. Yariv, "Components for Integrated Optics", AD 77152, Defense Documentation Center, Alexandria, Virginia (1973). Similarly, laser 14 may be an integrated circuit, distributive feedback laser which may also be fabricated within substrate 56.

In the illustrated embodiment, substrate 56 may be comprised of a first plane 58 offset and isolated from a second plane 60 by means of a layer 62. Layer 62 may be fabricated of any material well known to the art which is substantially opaque to the optical frequencies used, thereby preventing coupling between overlying and underlying waveguide segments, or may merely have a thickness of such dimension that coupling between the crossing waveguide segments is negligible. FIG. 3 illustrates a first waveguide segment 64 coupled to a waveguide transition segment 66. Waveguide transition segment 66 is an ideal 90° bend which is twisted from first plane 58 to second plane 60. Although FIG. 3 shows a relatively sharp bend, it is to be understood that the bond may have a radius many times greater than the waveguide dimension in order to minimize coupling losses through the transition segments. The opposing end of transition segment 66 is coupled to a waveguide segment 68 disposed in second plane 60. Waveguide segments 64 and 68 and twisted transition segment 66 may be fabricated in substrate 56 by means well known to the art. Typically, these waveguide segments are formed by doping substrate 56 to appropriately alter the optical properties of selected regions of the substrate. Doping concentrations and masking can be achieved by any of the many well known means which have been successfully employed by the integrated circuit art or integrated optics art. Typically, ion implantation techniques provide the definition and diffusion control which is necessary for the fabrication of optical waveguide.

One way in which a transition waveguide section may be fabricated is shown in detail in FIG. 4. For the purposes of illustration only, the cross section of FIG. 4 shows a transition between first plane 58 and second plane 60 along a linear path. Waveguide segment 64 may be fabricated to terminate in a tapered end section 70 which has a surface 72 selectively exposed by an opening in layer 62. A matching tapered end section 74 is disposed on surface 72, is disposed within second plane 60, and is coupled to waveguide segment 66. Tapered end section 72 and 74 may be fabricated by any means well known to the art, such as partial masking during deposition to form a tapered film edge. See for example, P. K. Tien and R. J. Martin, "Experiment on Light Waves in a Thin Tapered Film and a New Light Wave Coupler," Appl. Phys. Lett., Vol. 18, Pp. 398-401, (May 1, 1971); P. K. Tien, et al., "Formation of Light-Girding Interconnections in an Integrated Optical Circuit by Composite Tapered-Film Coupling," Appl. Op. Vol. 12, No. 8, pp. 1909, 1914 (1973). Although the embodiment of FIG. 3 shows a transition segment 66 which is both bent and tapered, it is entirely within the scope of the present invention that a linear transition element as shown in cross section in FIG. 4 may precede a waveguide bend in order to simplify fabrication or minimize losses through the transition element and bend. It is to be understood, however, that the present invention is not limited to the waveguide transition shown in FIG. 4, but any waveguide transition segment or its equivalent which is capable of vertical displacement within a substrate may be used.

FIG. 5 shows a detailed perspective of a waveguide crossing in substrate 56. Waveguide segment 76, disposed in second plane 60, is shown as crossing waveguide segment 78 disposed in first plane 58. As described, waveguide 76 and 78 are offset and isolated by means of layer 62 such that substantially no optical enegy is coupled between the crossed waveguides.

Figure 6:
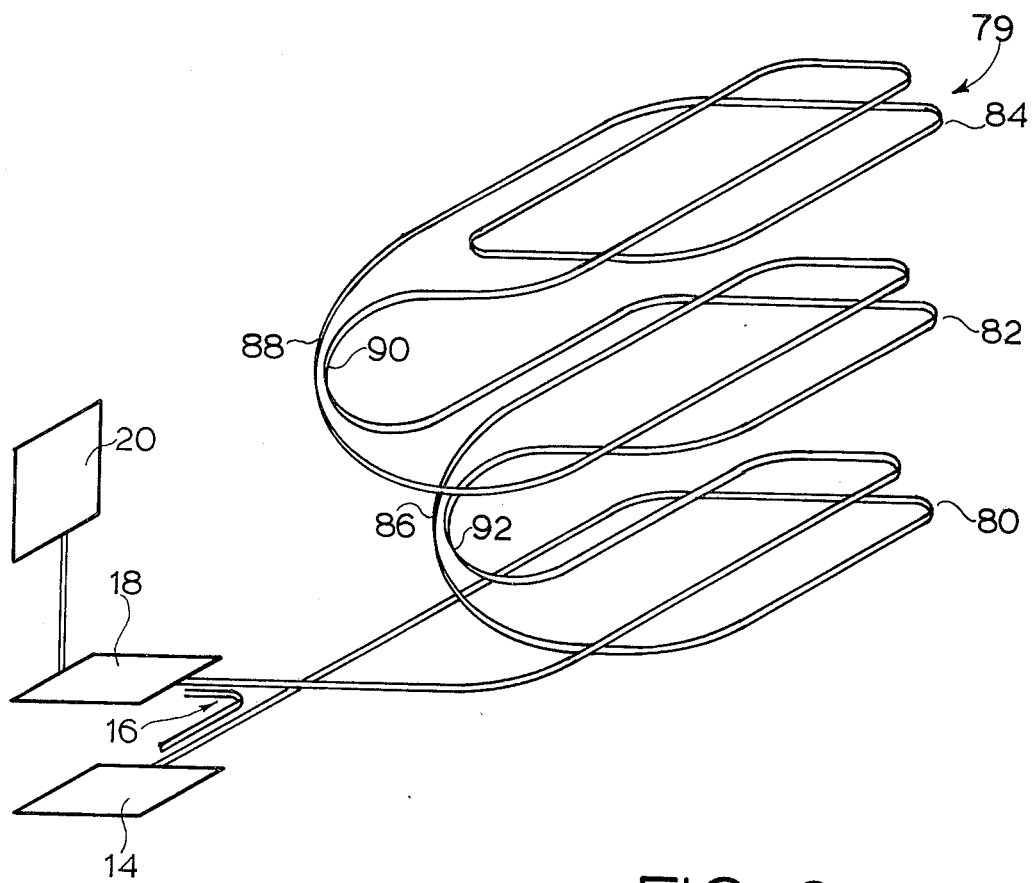
FIG. 6 is another embodiment of the present invention wherein a plurality of double plane layers are coupled to form a compound interferometer path.

FIG. 6 illustrates in a simplified diagrammatic perspective one manner in which a multiplicity of double plane transmission paths 12 might be stacked and coupled to obtain a compound transmission path 79. In the illustrated embodiment of FIG. 6, three double plane paths have been shown by way of example, namely a lower path 80, an intermediate path 82, and an upper path 84. It is to be explicitly understood that any number of paths may be coupled to obtain the advantages of a greater enclosed area within compound transmission path 79. In addition, paths 80, 82, and 84 are shown as having only two loops, although it is to be understood that the double plane loop of FIG. 1 may also be incorporated as well as any other configuration. The light beam generated by laser 14 is split by beam splitting means 16. A portion is propagated through one-half of lower path 80 and is coupled by means of a transition waveguide segment 86. According to the illustrated embodiment, the first half of lower transmission path 80 is disposed in a first plane of the double layered transmission path 80. Similarly, transition waveguide segment 86 is coupled to a first loop within an intermediate transmission path 82, which loop may also be disposed on a first plane within transmission path 82. The first loop of transmission path 82 is coupled by means of a transition waveguide segment 88 to upper transmission path 84. The beam propagates around the entire length of upper transmission path 84 disposed in a first and second plane. The beam is returned by means of transmission waveguide segment 90 through the second loop of intermediate transmission path 82 which is disposed in a second plane. Similarly, a second loop of transmission path 82 is coupled by means of transition waveguide segment 92 to the second loop of lower transmission path 80 also disposed in a second plane therein. The beam then exits compound transmission path 79 and is recombined with the reference beam by beam splitting means 16. The induced phase shift is then detected by phase detector 18 to produce an output in utilization device 20. Thus, by use of multiple stacked layers, the effectively enclosed area of compound transmission path 79 may be multiplied and the sensitivity of the interferometer increased several fold. It is to be understood, however, that the propagation pattern illustrated in FIG. 6 is illustrative only and that any propagation pattern may be employed. For example, it is entirely within the scope of the present invention that the entirety of lower transmission path 80 might be traversed by the propagating beam before it is coupled to the next succeeding layer. The propagating beam could then traverse the entire transmission path in each layer before proceeding to the next and then be returned to the initial starting point by an appropriate waveguide transition segment.

Whereas various alterations and modifications of the integrated optical components and their couplings may be necessary over the organization as shown in FIG. 1, such alterations and modifications need not substantially alter the arrangement and configuration of transmission path 12. It is to be understood that although the present invention has been described generally and particularly in reference to integrated optics constituting a ring interferometer, further alterations, modifications, and configurations of the transmission path of the present invention, including the employment of more than two planes of waveguide patterns, may be made with those having ordinary skill in the art without departing from the spirit and scope of the present invention.

I claim:

1. In an inertial rotational sensor, a closed transmission path comprising:
   a first plurality of waveguide segments, each segment lying in a first plane and generally providing for transmission of electromagnetic energy;
   a second plurality of waveguide segments, each segment lying in a second plane offset from said first plane and generally providing for transmission of electromagnetic energy; and
   a corresponding plurality of waveguide transition segments coupling each waveguide segment of said first plurality in said first plane with a corresponding waveguide segment of said second plurality in said second plane to form a closed loop.

2. The closed transmission path of claim 1 wherein said waveguide segments and waveguide transmission segments are optical dielectric waveguides formed in a dielectric substrate.

3. The closed transmission path of claim 1 wherein at least one of said corresponding plurality of waveguide transition segments is a generally circular bend having a twist out of the plane of said bend to couple said waveguide in said first plane with said waveguide in said second plane.

4. The closed transmission path of claim 1 wherein said waveguide transition segment is comprised of a first and second tapered coupler, said first tapered coupler arranged and configured to couple electromagnetic energy into and out of said waveguide lying in said first plane, said second tapered coupler arranged and configured to couple electromagnetic energy into and out of said waveguide lying in said second plane.

5. The closed transmission path of claim 4 wherein said first and second tapered coupler include a generally circular bend.

6. In a ring interferometer for sensing inertial rotations, an optical path comprising:
   a first plurality of dielectric waveguide segments formed in a substrate on a first plane;
   a second plurality of dielectric waveguide segments formed in said substrate on a second plane offset and optically isolated from said first plurality of dielectric waveguide segments; and
   coupling means formed in said substrate for transmitting optical energy between said first plurality of waveguide segments and said second plurality of waveguide segments, said first and second plurality of waveguide segments. together with said coupling means forming a continuous optical path enclosing an area and having a length, said area and length having a predetermined ratio.

7. The optical path of claim 6 wherein said coupling means is a first and second tapered coupler, said first tapered coupler to couple optical energy out of said first plurality of dielectric waveguide segments, said second tapered coupler to couple optical energy into said second plurality of dielectric waveguide segments.

8. In an inertial rotational sensor, a waveguide transmission path comprising an ordered plurality of coupled waveguide loops in a first and second plane, each waveguide loop, at least partially circumscribing an area and having at least one crossing waveguide segment in said first plane crossing a waveguide segment of at least one other one of said plurality of waveguide loops in said second plane, said crossing waveguide segment being offset and isolated from said waveguide segment of said other one of said plurality of waveguide loops.

9. In an inertial rotational sensor, a waveguide transmission path comprising an ordered plurality of coupled waveguide loops, a first waveguide loop of said ordered plurality forming a generally rectangular loop having a horizontal and vertical dimension of a preselected magnitude, a second waveguide loop having a horizontal dimension less than the said first waveguide loop by a predetermined amount and a vertical dimension greater than said first waveguide loop by said predetermined amount, each higher order waveguide loop decreasing in horizontal dimension and increasing in vertical dimension, each waveguide loop at least partially circumscribing an area and having at least one crossing waveguide segment crossing at least one other one of said plurality waveguide loops, said crossing waveguide segment being offset and isolated from said other one of said plurality of waveguide loops.

10. The transmission path of claim 9 wherein said generally rectangular loop is a dielectric, optical waveguide formed within a substrate in a first and second plane and is formed of segments of straight waveguide coupled by waveguide bends, and coupling means for transmitting optical energy between said first and second planes, substantially each straight waveguide segment aligned to said horizontal dimension lying in said first plane and substantially each straight waveguide segment aligned to said vertical dimension lying in said second plane.

11. The transmission path of claim 10 wherein said coupling means is a first and second tapered coupler, said first tapered coupler to couple optical energy out of its corresponding waveguide loop, said first and second tapered couplers being extensions of each said corresponding waveguide loop and being mutually coupled together.

12. In an inertial rate sensor, a transmission path comprising a plurality of layers of waveguide loops disposed in a substrate, each layer of waveguide loops including a pluraity of crossing waveguide loops disposed in a first and second plane so that said crossing waveguide loops are offset and isolated in said first and second planes, each plurality of waveguide loops disposed in one said layer of waveguide loops coupled to another one of said plurality of layers of waveguide loops to form a single closed path extending through said plurality of layers.

13. The transmission path of claim 12 wherein said plurality of layers form an ordered plurality of layers of waveguide loops, each layer of waveguide loops characterized by a corresponding path length, and wherein a first half of said path length of the first layer is coupled to a first half of said path length of the second layer, a first half of each ordered layer coupled to a first half of the path length of each ascending ordered layer until the last of said ordered plurality of layers, said last ordered layer having its first and second halves coupled, said second half of said last ordered layer coupled to a second half of said path length of said next to last ordered layer, a second half of each ordered layer coupled to a second half of the path length of each descending ordered layer to form said single closed path extending through said plurality of layers.

14. The transmission path of claim 13 wherein each layer of waveguide loops are coupled by a tapered waveguide coupler.

* * * * *